United States Patent [19]

Eidson et al.

[11] Patent Number: 5,586,305
[45] Date of Patent: Dec. 17, 1996

[54] SMART DISTRIBUTED MEASUREMENT AND CONTROL SYSTEM WITH A FLEXIBLE ARCHITECTURE

[75] Inventors: John C. Eidson, Palo Alto; Joseph A. Dara-Abrams, Los Altos; Stanley P. Woods, Santa Clara, all of Calif.

[73] Assignee: Hewlett-Packard Company, Palo Alto, Calif.

[21] Appl. No.: 327,088

[22] Filed: Oct. 21, 1994

[51] Int. Cl.⁶ .......................... G06F 13/00; G06F 17/00; G06F 11/00
[52] U.S. Cl. .................. 395/500; 395/300; 364/132; 364/133; 364/148; 364/550; 364/551.01
[58] Field of Search ...................... 395/500, 300, 395/650; 371/22.1, 22.4; 364/132, 133, 148, 550, 551.01

[56] References Cited

U.S. PATENT DOCUMENTS

| | | | |
|---|---|---|---|
| 4,774,677 | 9/1988 | Buckley | 364/513 |
| 4,831,558 | 5/1989 | Shoup et al. | 364/550 |
| 4,914,657 | 4/1990 | Walter et al. | 395/650 |
| 5,165,018 | 11/1992 | Simor | 395/300 |
| 5,260,946 | 11/1993 | Nunally | 371/22.1 |
| 5,335,323 | 8/1994 | Kolnick | 395/164 |
| 5,390,351 | 2/1995 | Di Giulio et al. | 395/725 |
| 5,499,374 | 3/1996 | Di Giulio et al. | 395/728 |

FOREIGN PATENT DOCUMENTS

| | | | |
|---|---|---|---|
| 2144115 | 2/1985 | United Kingdom | G01P 21/00 |
| 2215150 | 9/1989 | United Kingdom | G01K 7/02 |
| 2256056 | 11/1992 | United Kingdom | G01K 7/00 |
| WO91/02300 | 2/1991 | WIPO | G05B 19/04 |

OTHER PUBLICATIONS

Kremien J. Kramer, "Flexible Load Sharing in Configurable Distributed System," IEEE, pp. 224–236.
Cahn et al., "Intrepid", IEEE, Jul. 1991, pp. 40–47.
Kremien et al., "Scalable Load Sharing For Distributed Systems," IEEE, 1993, pp. 632–641.
Stavenow et al., "A Flexible Switching Node Architecture for B–ISDN Options and Implementation Concept", IEEE, pp. 499–505.
Mutambara et al., "Modular Scalable Robot Control", IEEE, 1994, pp. 121–127.

Primary Examiner—Kevin J. Teska
Assistant Examiner—Thai Phan
Attorney, Agent, or Firm—Pamela Lau Kee

[57] ABSTRACT

A distributed adaptable measurement network, which has flexible sensor or actuator nodes, takes multiple single valued measurements, such as temperature, pH, density, turbidity, velocity, breakdown strength, and strain as a function of time. The network can control large scale physical processes in response to these measurements. The flexible sensor or actuator node uses interchangeable common core modules, where each common core module uses a common description for data configuration and control of the measurement and response parameters. Although many physical variables can be affected, each variable is controlled in the same fashion. A transducer module selects the physical variable to which the common core module will be sensitive and whether its role will be that of a sensor or an actuator. The network may also contain system transducers which can control or alter the initial measurement and response parameters selected by the transducer module.

10 Claims, 8 Drawing Sheets

SMART DISTRIBUTED MEASUREMENT AND CONTROL SYSTEM WITH A FLEXIBLE ARCHITECTURE

FIELD OF THE INVENTION

The invention pertains generally to distributed measurement and control systems and more particularly to such systems having a flexible architecture that allows a wide range of transducers, actuators, and higher level functions to be easily configured, modified, and maintained over the life of the system.

BACKGROUND OF THE INVENTION

Distributed monitoring and control systems, (hereinafter referred to as distributed systems or distributed monitoring systems), are used in a variety of applications such as environmental monitoring, process control, building monitoring, and medical monitoring. Current practice consists of the custom design of a system incorporating transducers selected for measuring or controlling the physical parameters of interest at the time of design. Typical transducers are sensors for temperature, pressure, or pH, or actuators such as relays, automatic valves or indicators. In these designs, the behavior of each measurement or control point is determined by the transducer and the overall design of the system. Such designs generally call for fixed behavior such as multiple readings from temperature sensors being combined to control a process furnace, or a fixed pattern of collecting measurements from an array of sensors with the data being printed or stored.

When a monitoring system designer attempts to design a system that not only meets the user's present needs but also anticipates the user's evolving needs, additional fixed-behavior transducers beyond those needed only for present needs must be incorporated into the distributed monitoring system. Meeting all these needs with a single design often results in a costly and overdesigned monitoring system. One alternative to these drawbacks is to modify the system when the user's needs have changed. However, once the system has been installed, the behavior of the transducers themselves cannot be changed. When a transducer has become outdated, it must be replaced. Replacing such fixed-behavior transducers is expensive and incurs unnecessary waste.

Even when a distributed system is adequate for normal operating conditions, it may fail to perform under unforeseen adverse conditions. For example, a system designed to monitor the pollutants in a river system may function under normal conditions but be inadequate to monitor the progress of a major spill. Under such abnormal conditions a supplementary system must be installed or the original system greatly overdesigned to accommodate such conditions.

Furthermore, as applications change the behavior of the individual nodes or the collective behavior of the original system may no longer be adequate. For example, consider a system designed to monitor the conditions of transformers in an electric utility switchyard. The original design might have called for a polled system which permitted remote recording of the transformer temperature of each transformer in the yard. After an upgrade to increase the capacity of the switchyard, it may be that in addition to temperature, that it is desirable to monitor the chemistry of the headspace above the insulating oil, and the vibration level at the transformer and to report only deviations from a norm. The original system will be entirely inadequate and will need to redesigned.

What is needed is a distributed monitoring system in which the nodes can be customized in operation to meet the users' evolving and peak needs. Any modification to either the behavior and characteristics of the individual nodes or the collective behavior of the system as a whole should be easily achieved with minimal expense and effort.

SUMMARY OF THE INVENTION

A distributed measurement system according to the invention is a collection of nodes which are designed to be flexible in three areas: transducer related, measurement and control related, and overall system and application related.

This flexibility is achieved by having a common core design for all nodes in the distributed system. Systems are designed, built, and modified by tailoring the functionality of the flexible node to suit the problem at hand. Node functionality can be altered locally yet the node can retain the ability to function in the overall system. The flexible node may be customized to meet a wide variety measurement and control functions such as the measurement of temperature and vibration amplitude, or the control of relays and indicators, as well as the generation of specific signals such as electrical pulses. Flexible nodes will be one of three types: sensors where the nodes act as a source of data, actuators where the nodes act primarily as receivers of data, or system nodes where more complex behavior such as operator interfaces, databases, supervisory control, or multi-transducer interfaces are implemented.

Each node contains three modules: the common core, a transducer module (if the node has a measurement of actuator function), and a communication module. An optional application module may be used for tailoring nodes for specific applications. These modules can be physically distinct to allow easy replacement and maintenance in the field. In addition to the functionality, the interfaces to the distributed system and to the transducer module can be customized to suit the immediate application.

The common core module supports and manages the node configuration. The node configuration is customized by parameters provided by the transducer module to reflect the desired functionality. The parameters include the transformation of signals between the transducer output and the digital representation of the corresponding physical variable according to the calibration information provided by the transducer module. The common core module formats all data to adhere to a novel uniform format which characterizes any physical variable regardless of the transducer or the selected node behavior. This uniform format allows all nodes in the system to communicate without further specialization. The common core manages local phenomena such as the timing of measurements, data handling, local computation, and other measurement related aspects such as node identification, location and time of measurement, measurement units, and measurement description. The common core module manages network related phenomena such as changing the measurement related properties of the node in response to messages received by the node, e.g., changing the sampling rate, establishing and modifying the communication patterns among the nodes in the system, managing the transport properties of communication among the nodes, and the synchronization of the node clocks.

A more complete understanding and appreciation of the aims and objectives of the present invention may be achieved by referencing the following description of the preferred embodiment and the accompanying drawings.

DETAILED DESCRIPTION OF THE PREFERRED EMBODIMENTS

A distributed monitoring system which has a measurement function has at least one flexible distributed node for taking multiple single-valued measurements of physical quantities such as temperature, pH, density, turbidity, velocity, breakdown strength, position of a switch, or strain as a function of time. If the system has a control function, then at least one of the flexible distributed nodes must behave as an actuator or a system node. Such a system can control large-scale physical processes in response to the measurements made by the flexible nodes behaving as sensors. Each flexible node contains a transducer module, a common core module, and a communication module. The common core module maintains a node configuration having network and functionality parameters that can be customized. The transducer module customizes the functionality parameters such that the flexible node exhibits the desired behavior. The user can change the behavior with minimal waste and expense by replacing the transducer module with one of a different type e.g. replacing a temperature transducer with a pressure transducer or perhaps a more accurate temperature transducer. The node configuration is described by models and formats which are uniform throughout the distributed monitoring system. In particular, the data exchanged among the nodes of such a system adheres to a novel uniform format such that the network parameters may be modified by a system node, for example in response to input from an operator, or by another flexible distributed node.

Figure 1:
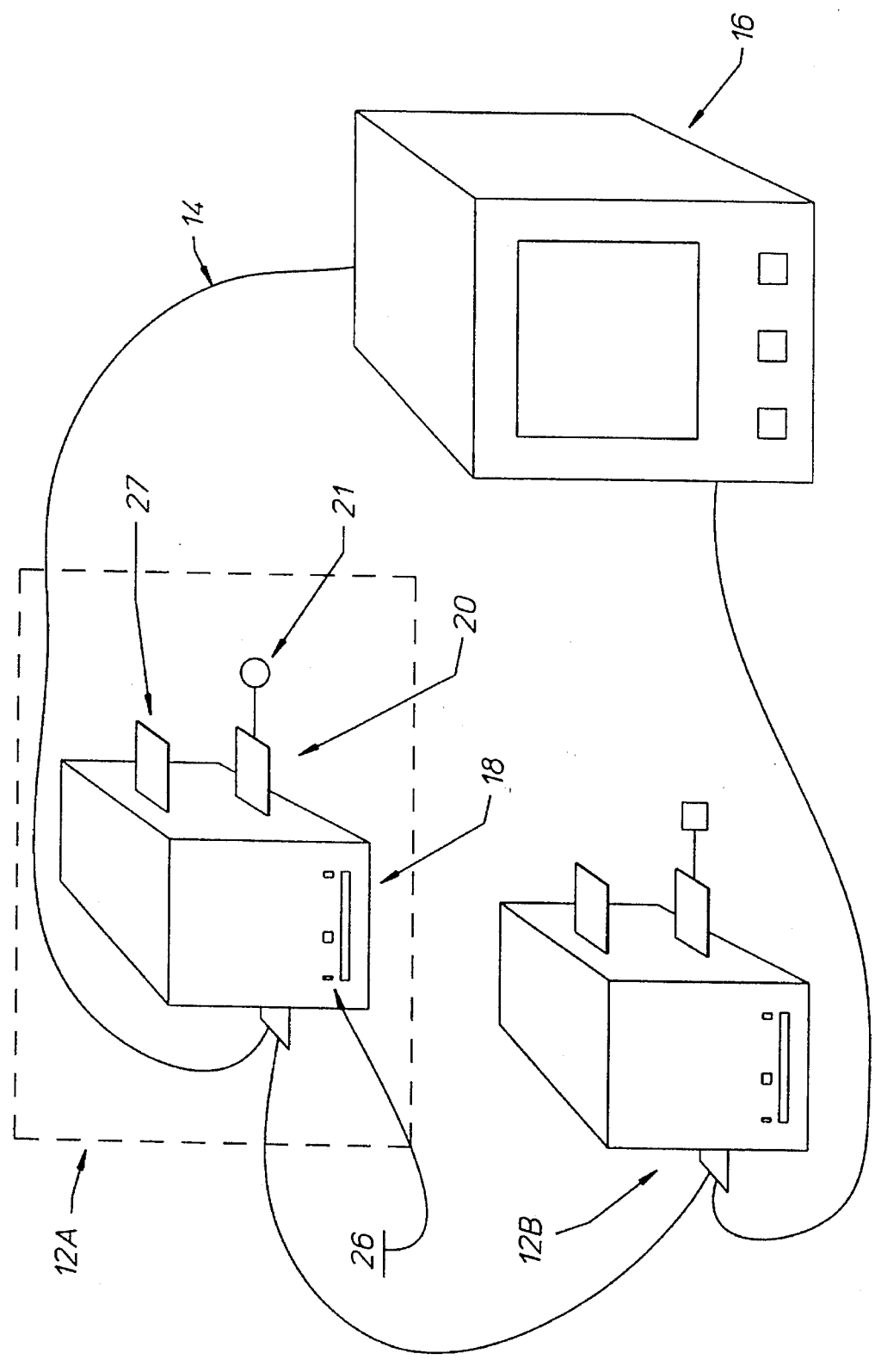
FIG. 1 illustrates an example of a distributed monitoring system according to the invention.

FIG. 1 pictorially illustrates a distributed monitoring system 10 containing flexible nodes and an optional flexible system node. A first flexible node 12A, which behaves as a sensor, is connected to a second flexible node 12B, which behaves as an actuator, through a communication means 14. Each flexible node 12A, 12B can generate or receive a signal that represents a physical or application variable, or control information. An optional flexible system node 16 is connected to the first and the second flexible nodes 12A, 12B through the communication means 14. The flexible system node 16 may exhibit both actuating and/or sensing behavior or it may implement other functions such as operator interfaces, displays of data or system state, databases, or system level control. Such a system node can, for example, provide supplemental evaluation of the signals or partition the flexible nodes into separate non-interacting logical groups, according to criteria such as behavior or usage, to provide the system designer and user with flexibility in system organization, data management, and control.

For each flexible node 12A, 12B, a communication module 22 is connected to the communication means 14 and to a common core module (CCM) 18. The CCM 18 connects to a transducer module 20 and an optional application module 27. A transducing element 21 is attached to the transducer module 20. The transducing element 21 can be an actuator or a sensor.

Figure 2:
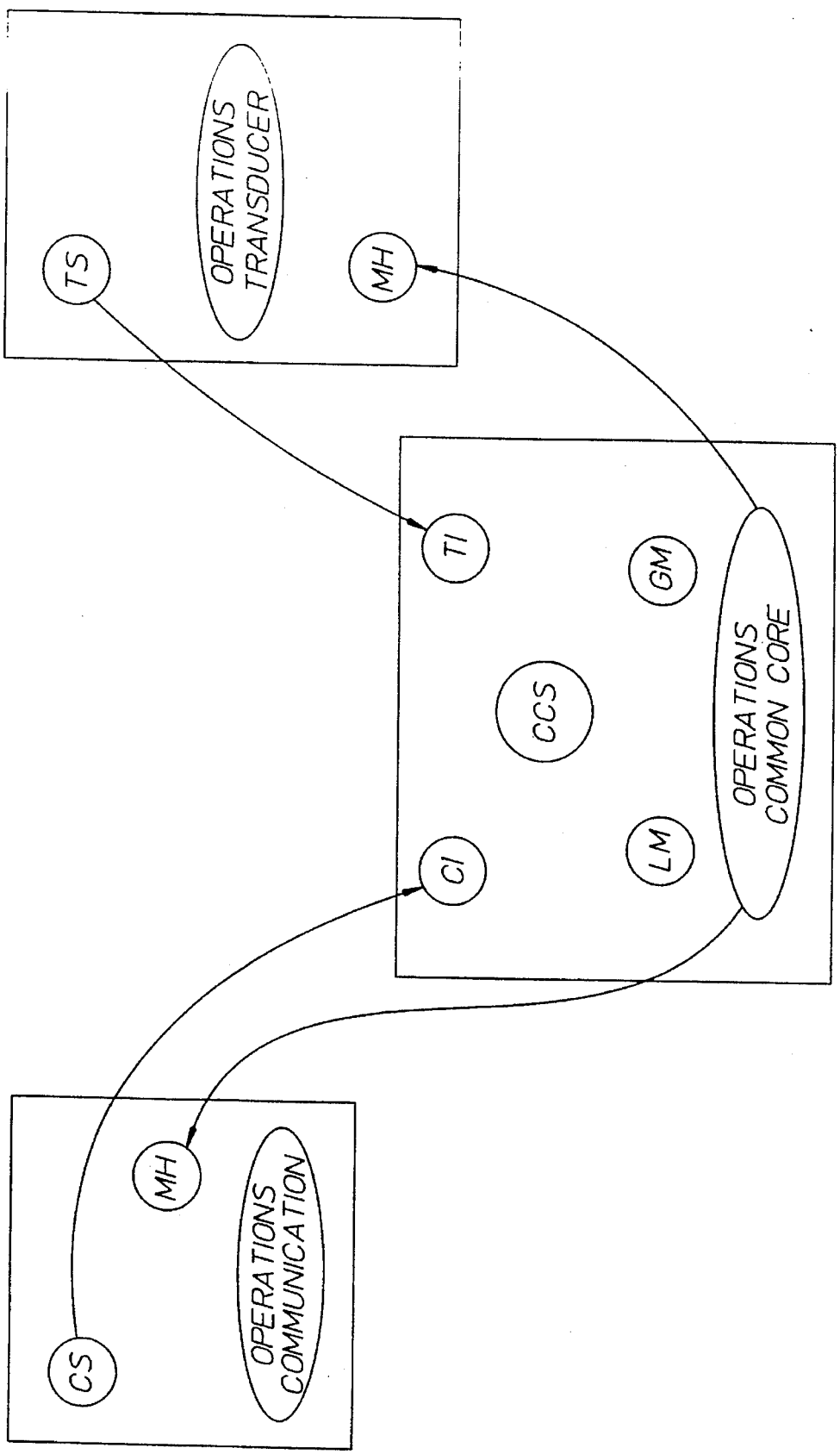
FIG. 2 is an abstract description of the flexible node.

FIG. 2 is an abstract description of the flexible node. There are three essential modules: communication, common core, and transducer. Each module has an operational nucleus and a module overlay. The module overlay describes different parameter classes that are used to tailor the apparent functionality of the operational nucleus. The operational nucleus of the common core manages the data traffic and translation locally (between the modules) and globally (between the flexible nodes).

The module overlay of the common core module has five different parameter classes: common core specific (CCS), transducer interface (TI), communication interface (CI), local management (LM), and global management (GM). The CCS parameters include operational and identifying properties that describe the basic functionality for the module. The TI parameters refine the basic functionality to incorporate the desired behavior of the transducer with the CCM while the CI parameters refine the basic functionality to incorporate the communication interface description into the basic functionality. The LM parameters govern how the CCM should use these CCS, TI, and CI parameter classes, i.e. the local module management. The GM parameters govern how the CCM should interact with other modules in the distributed network.

The module overlay of the transducer module has two parameter classes: transducer specific (TS) and management handling (MH). The TS parameters include behavioral, operational, identifying properties that uniquely define the desired transducer function in terms of the physical variable name and units, the type of electrical signal, either sensing or actuating, that represents the physical variable, and the calibration method and parameters needed to transform a digitized representation of this signal into a correctly calibrated representation of the physical variable.

The module overlay of the communication module has two parameter classes: communication specific (CS) and management handling (MH).

The operational nucleus of the common core contains functional behavioral models that generically describe both the common core with respect to the communication module interface and the common core with respect to the transducer interface. However, these models lack meaning without a common language or means for interpretation. That is, they have a common grammar without having a common "vocabulary". The respective module overlays provide the common vocabulary for the modules and hence the flexible nodes can communicate with one another. Particularly, the management handling parameter classes for each module are governed by the operational nucleus of the common core to create a local "language" that is consistent with the global "grammar" of the system. The global "grammar" is provided by the uniform format.

Figure 3:
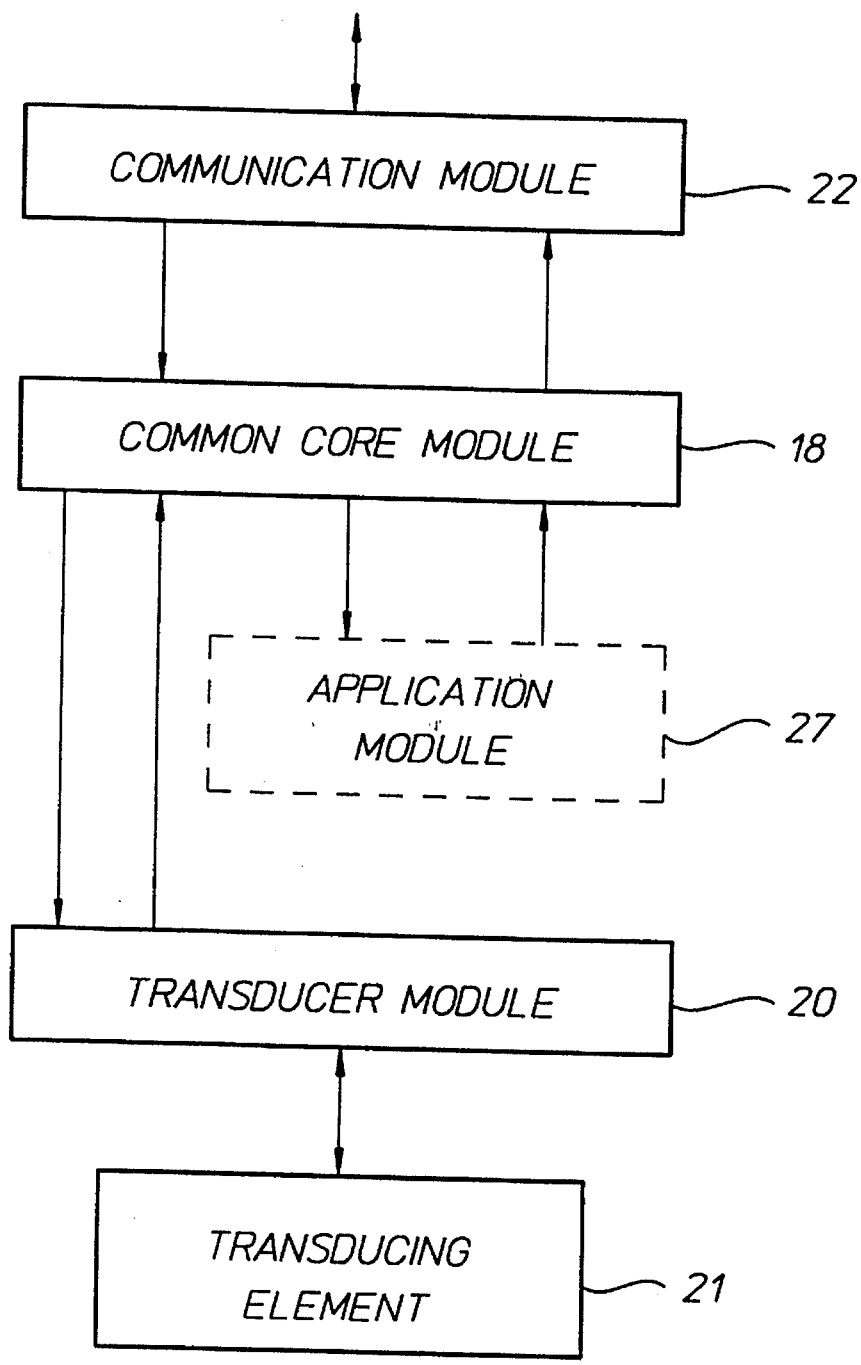
FIG. 3 is a functional block diagram showing the physical partitioning of the flexible node depicted in FIG. 1.

FIG. 3 illustrates a functional block diagram of the flexible node 12A, 12B depicted in FIG. 1.

Upon receiving a probe signal from the CCM 18, the transducer module 20 sends information describing the transducer specific parameters according to the uniform format. From this data, the CCM 18 determines whether the flexible node behaves as a sensor, i.e. a pressure gauge, or an actuator, i.e. a flow control valve. The resulting electrical signal is then manipulated by the CCM 18 according to the uniform format so that each flexible node 12A, 12B can interact with other components in the distributed monitoring system.

When the transducer module 20 specifies and implements an actuator function, the CCM 18 implements an actuating signal and directs the transducing element 21 via the transducer module 20 to produce a corresponding physical result. When the transducer module 20 specifies and implements a sensing function, the transducing element 21 measures a single physical variable at times defined by the behavioral models specified in the CCM. The CCM transforms the resulting sensing signal into a correctly calibrated network message that can be transmitted to the network by the communication module 22 according to the selected behavioral model. The CCM 18 of any flexible node may generate data for transmission over the communication means 14 using the uniform format. The data sent may be modified, or control messages may be generated according to the optional application module 27. Such messages or data are received by the CCM 18 of other flexible nodes to supplement the "vocabulary" or alter the parameters of their respective configurations or to determine the value of an actuator in the case of an actuator node. The parameters applied to the behavioral models need not be identical in all nodes in a distributed system which gives the system designer great flexibility in tailoring the behavior of the nodes to a given application.

Although the single transducer embodiment is described, the concept is easily extendible to a flexible node containing multiple transducers and transducer modules.

Figure 4:
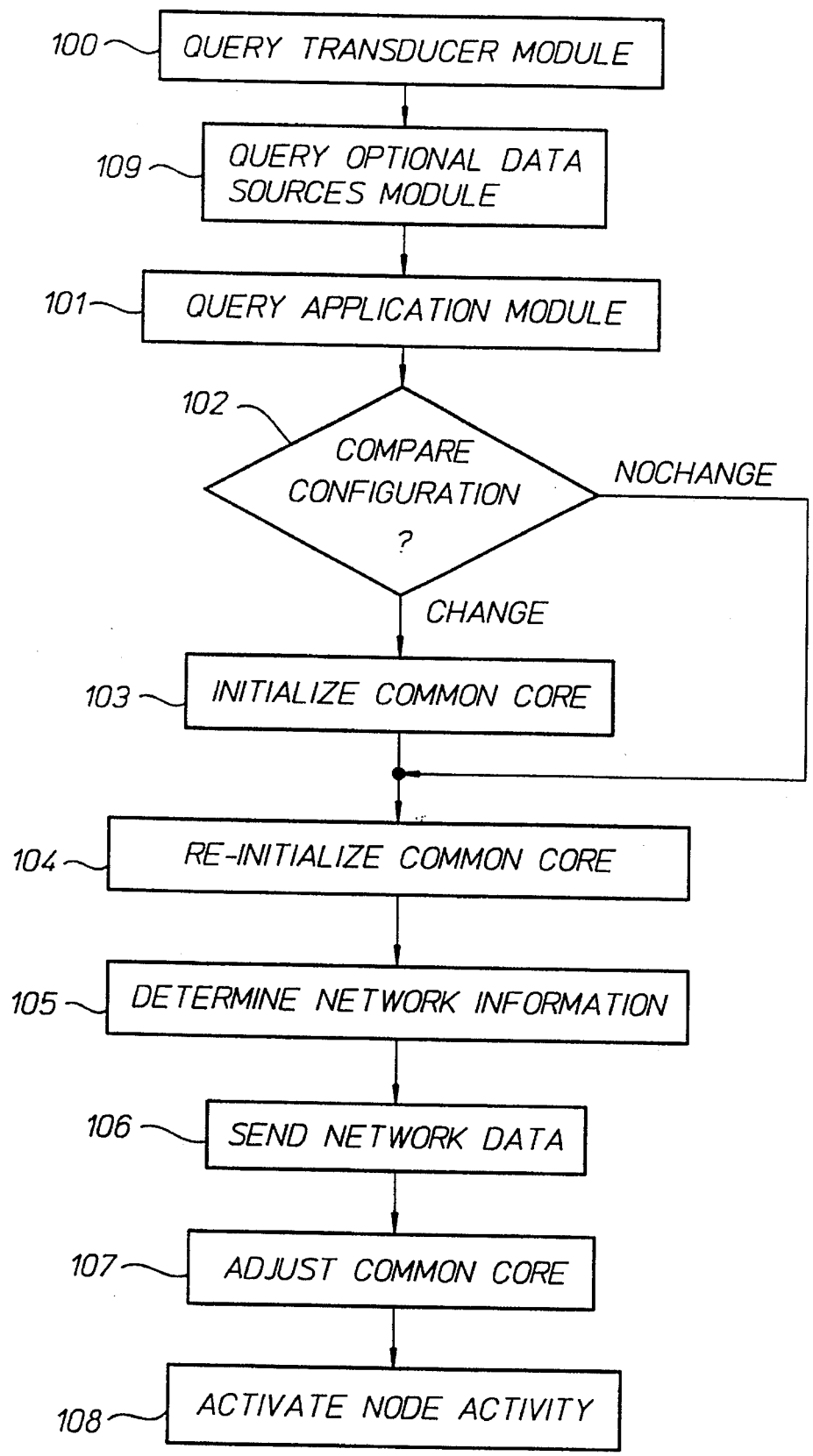
FIG. 4 illustrates a process flowchart for initializing the common core module.

FIG. 4 illustrates a process flowchart for initializing the CCM 18. Initialization occurs at power-up or when the node is reset for any reason. Initially, the common core module queries the transducer module for an initial transducer configuration (block 100). Next, the CCM sends a query signal to the optional data sources to request any optional data available to this node (block 109). Next the CCM sends a query signal to the optional application module 27, to request application specifications (block 101).

Next, (block 102), the requested transducer configuration and supplemental data are checked for validity and compared to the reference configuration or previous configuration. If any portion of the newly queried information differs from the last known state, the reference configuration of the CCM 18 is set to a set of default conditions according to the received configuration and data (block 103). If the information is unchanged, block 103 is skipped. This allows for nodes to retain their configurations in the presence of power failure, for example. The CCM is then configured to match the reference configuration (block 104).

Next, the CCM listens to the network (block 105). Subsequently, the CCM 18 transmits data specified by the behavioral models and the uniform format to the network (block 106). The data includes the time in the local node according to the models specifying the clock synchronization protocol for the distributed system. The CCM 18 then adjusts (block 107) the configuration of the CCM to reflect the information received.

For example, the clock synchronization protocol initialization is part of blocks 105, 106, and 107. Likewise, the presence on the network of certain types of nodes is determined in these blocks and effects the behavior specified in the data management behavioral models of the CCM. Finally in block 108, the normal node activity is started.

The optional flexible system node 16 is initialized in similar fashion to that outlined. However, since system nodes often implement more complex functionality, such as a database, the implementation may not involve an actual transducer or application module per se and this will be reflected in the initialization. However, flexible system nodes will still implement the required behavioral models in so far as they are applicable (for example, the sampling rate does not apply to a database) and will adhere to the uniform format that governs all communication over the communication means.

Figure 5:
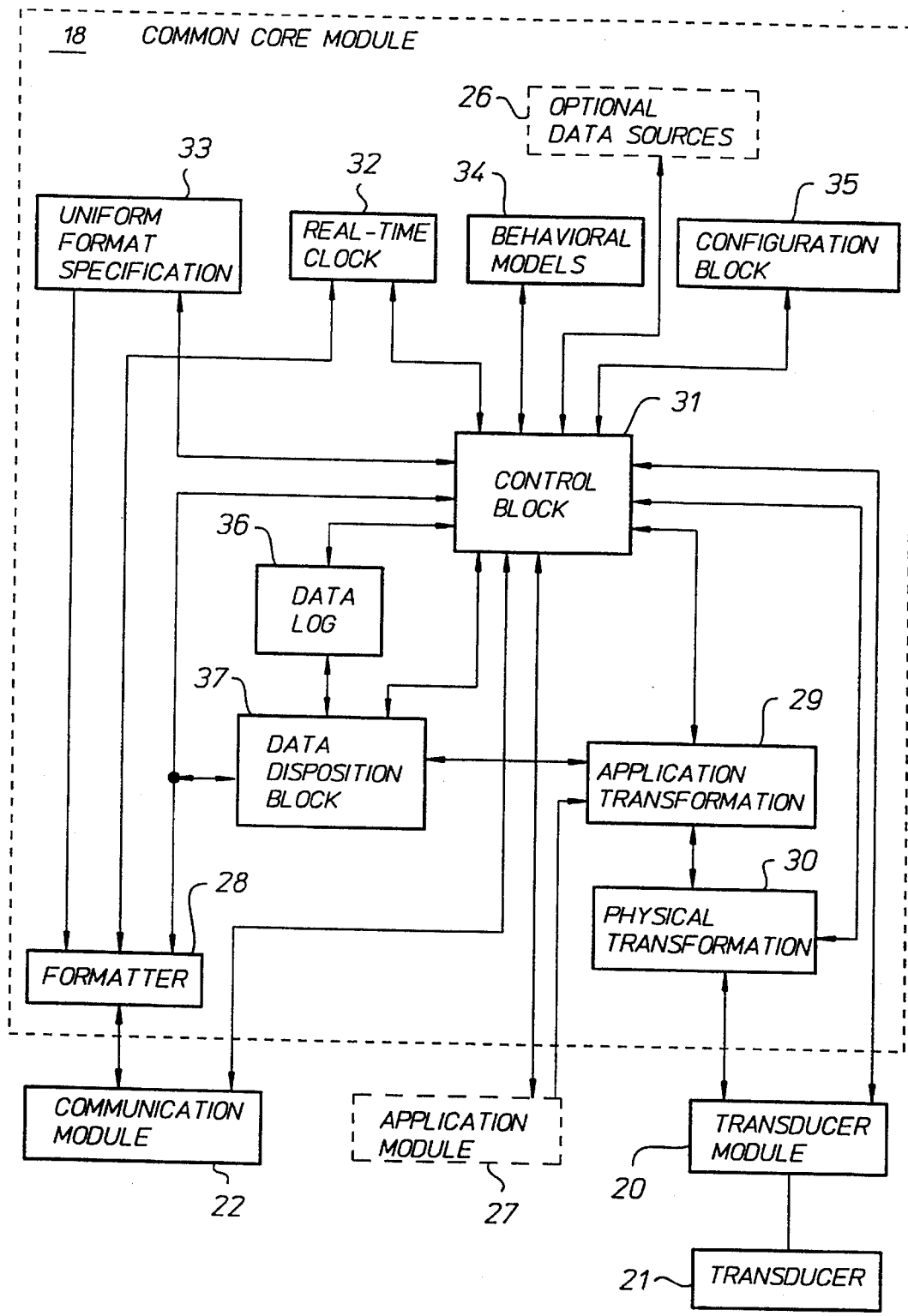
FIG. 5 is a functional block diagram of the common core module depicted in FIG. 3.

FIG. 5 is a functional block diagram of the common core module CCM 18 depicted in FIG. 2. The functionality of the CCM 18 is created by the behavioral models, communication and transducer parameters, and supplemental data. A uniform format specification 33 is connected to a formatter 28. The formatter 28 is connected to a real-time clock 32 and a control block 31. The real-time clock 32 is connected to the control block 31. A data log 36 is connected to the control block 31 and a data disposition block 37. The data disposition block is connected to the formatter 28 and an application transformation block 29. The application transformation block 29 is connected to the control block 31 and a physical transformation block 30. The physical transformation block 30 is also connected to the control block 31. The control block 31 is further connected to behavioral models 34, a configuration block 35, and optional data sources 26. The formatter 28 and the control block 31 interact with the communication module 22. The control block 31 and the application transformation block 29 interact with the application module 27. The physical transformation block 30 and the control block interact with the transducer module 20.

The formatter 28 provides management handling information to the communication module 22 according to the uniform format specification. This management handling information allows the communication module 22 to filter and reject data that neither matches the representation acceptable by the node nor originated from nodes belonging to the same group as the receiving node. Furthermore, if no application transformation has been specified, the accepted data must either exactly match the transducer specific parameters or be coercible based on supporting structures in the formatter 28, e.g. the formatter may be implemented to coerce integers to floats.

The optional data sources module 26 gathers supplemental data necessary for detailed interpretation of the data relevant to the transducer 21. For example, if the node is mobile, it may be desirable to include a GPS receiver or other mechanism for determining the position of the flexible node. Likewise, if the transducer is sensitive to spatial orientation, e.g. electric field strength, then an orientation sensitive device would be included in the optional data sources module 26. This module is queried as pan of initialization and can be queried at other times if directed by the appropriate behavioral model.

The behavioral models 34 define the basic functionality of the common core. The models define sampling, data disposition, and operating properties for the flexible node. Sampling occurs on a scheduled, event driven, or polled basis. The data disposition properties describe how the data should be handled. The control block 31 runs a protocol which identifies, on the basis of information exchanged on the network, whether there are appropriate recipients for the data from this node. This protocol is class based, i.e.

recipients are identified only by class, e.g. actuator or system nodes, rather than by specific node identity to allow for exchange, addition or deletion of recipient nodes without having to tailor the generating nodes and provides a key element in the flexibility of the distributed system. Operating properties for the CCM include normal operation, calibration, initialization, local or system reconfiguration. For more complex nodes in which a possible multiplicity of transducer 21 and transducer modules 20 are in use, the selection or order of selection from the multiplicity of transducers is defined by the behavioral models. In addition, if the optional data sources are used, the appropriate sampling properties are also defined. Furthermore, the set of behavioral models can be enhanced to provide even greater flexibility.

The real time clock 32 timestamps data as it is collected. The clock is synchronized with the corresponding clocks in the other nodes in the system via a synchronization protocol.

The configuration block 35 defines and maintains the configuration parameters relevant to the management handling parameter class of the common core. In particular, the configuration block describes how the physical transformation for the transducer module is to be done. The description includes the following calibration models: a series model with coefficients deemed by the transducer module, a category module where the category boundaries and corresponding output are defined by the transducer module, a direct transfer where no change is made between the digitized signal and the physical representation, and a subroutine which is defined by the transducer module but is executed in the physical transformation block of the CCM. The configuration block 35 further defines the appropriate network parameters, particularly the logical groups to which this node belongs. Every node belongs to one or more logical groups. The protocol run by the control block 31 allows these logical groupings to be altered. In the preferred embodiment, this protocol may be initiated and/or managed from any of the flexible nodes in the system. Alternatively, this same protocol may be initiated and managed from a system node using the support structures which are part of the control block 31. The control block 31 configures the communications module with the appropriate network parameters.

The data log 36 is a repository for data generated by the flexible node. The data log is used to store data received from the data disposition block 37 for later transmission to the network. Whether the data is logged in the data log 36 or directly transmitted is determined by the state of the relevant behavioral model 34. The data disposition block 37 under the direction of the control block 31 directs the data stream to the appropriate place.

The application transformation 29 transforms data between a representation pertinent to the overall application of which the flexible node is one member and the physical variable for which this particular flexible node is configured. This transformation is a computational transformation on digital data. This application transformation is received from the application module 27 during initialization, or may be received over the communication means 14 from another node at some time after initialization. If no application module 27 is present and if no application has been received over the communication means 14 then the application module 27 is a 1:1 transformation, i.e. it makes no changes to the data.

The physical transformation 30 bidirectionally transforms data between the selected representation of the physical variable and the raw transducer signal appropriate to the transducer module 20 and the transducer 21. This transformation may include a conversion between analog and digital representations and/or a computational transformation which transforms the digitized representation into a correct and calibrated digital representation, for the physical variable appropriate to the transducer 21 in use.

Locally, the control block 31 sends control signals to every block to which it is connected, to obtain, or if appropriate change, the state, operating or configuration information contained in the respective module. Globally, the control block directs the formatter 28 to transfer data to the communication module 22 or communicates directly to the communication module 22 to run the necessary protocols for determining the communication connections among the flexible system nodes and in particular the logical groupings to which individual nodes belong. The control block 31 is also responsible for probing optional data sources 26.

Figure 6A:
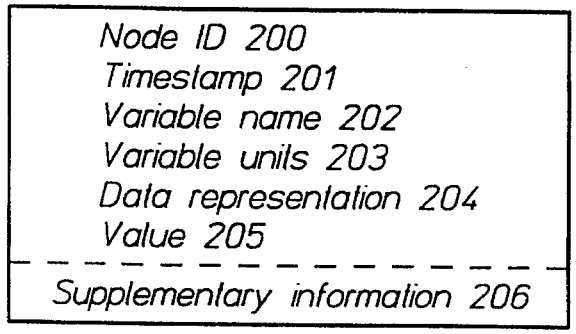
FIGS. 6A–C pictorially illustrate a minimum set of models and properties for the uniform format.
Figure 6B:
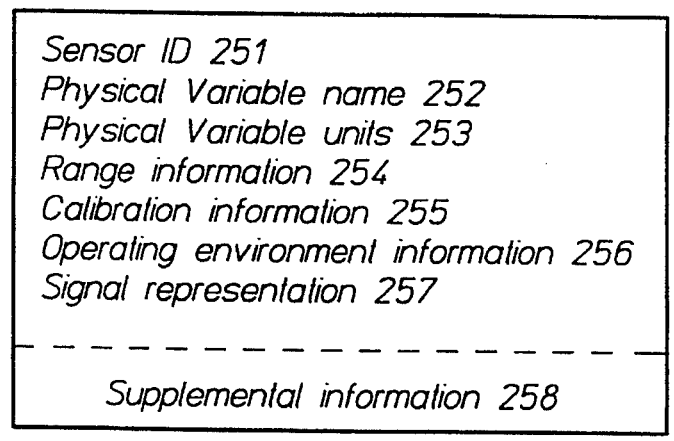
Figure 6C:
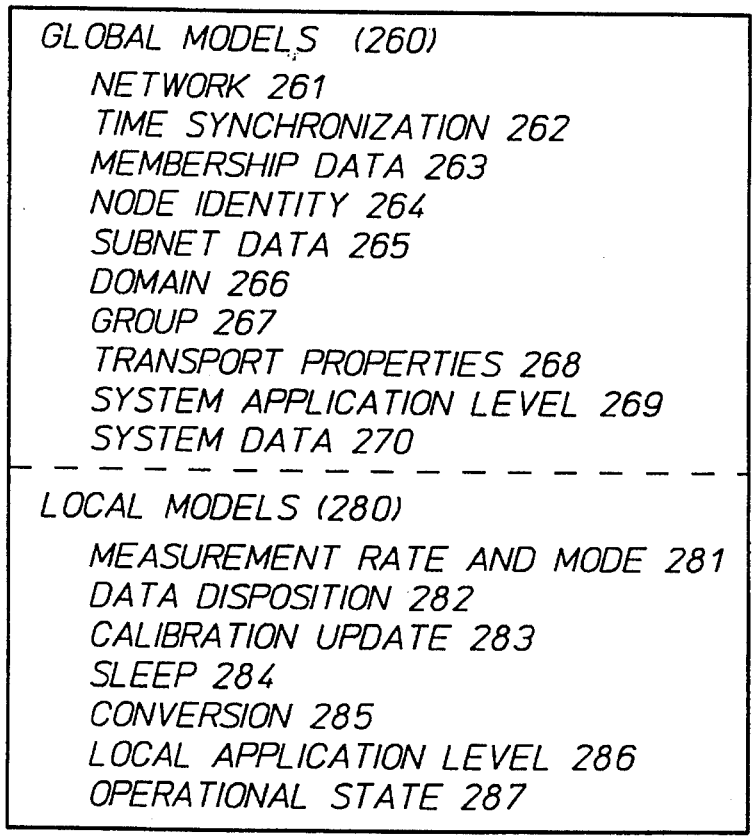

FIGS. 6A–C pictorially illustrate a minimum set of models and properties for the uniform format. This information distinguishes one data item from another in the distributed system. The nodes operate together and in a flexible and consistent manner as a result of the uniform format.

FIG. 6A illustrates the communication parameters for the network representation of the physical or application variable representing and defining a data value. Node ID (200) identifies the node from which the data has been generated and can be used as a pointer to a physical location of the measurement. Timestamp (201) defines the time that the data was measured. Variable name (202) distinguishes the data from other measurements made at the same instance and location. Variable units (203) defines the units in which the value of the data is expressed. Data Representation (204) expresses the form or type of the measurement that will be acceptable by other flexible nodes. Value (205) is data expressed in the desired network representation and units. Supplemental data (206) may be added to further enhance flexibility such as precision, accuracy, and confidence interval or actual coordinates or spatial orientation of the transducer.

FIG. 6B describes the transducer parameters needed to accept a variety of transducer modules 20. Sensor ID (251) allows the CCM to recognize the presence of a new transducer module to indicate that re-initialization is necessary. Physical variable name (252) defines the variable name appropriate to the transducer 21 e.g. "temperature" for a temperature transducer. Physical variable units (253) defines the units in which the value of the data is expressed. Range information (254) defines the upper and lower bounds for valid readings. Calibration information (255) describes the method of calibration to be used by the physical transformation block 30, the values of any required parameters of the transformation, and a definition of the expiration of the calibration. Operating environment information (256) defines the maximum sampling rate that the transducer will support and length of time needed to acquire a sample. Signal Representation (257) describes the form of the transducer module 20 signal which is exchanged with the CCM. Supplemental data (258) may be added to include variant items specific to the individual transducers.

FIG. 6C describes the functional behavioral models discussed in FIG. 2. These models reside in the operational nucleus of the common core. These models genetically describe both the common core with respect to the communication module interface and the common core with respect to the transducer interface. Local models 280 govern local management, i.e. common core interactions with the transducer module, communication module, and application module, while global models 260 govern global management, i.e. common core interactions with the distributed system.

The global models 260 use the parameters disclosed in FIG. 6A to govern the global management of the CCM. These models include but are not limited to: network 261, time synchronization 262, membership 263, node identity 264, subnet information 265, domain 266, group 267, transport properties 268, system application 269, and system data 270. For example, the network model 261 uses the Node ID (200) parameter to uniquely identify the common core module, particularly when the CCM is connected in a network. The CCM receives data according to the system data model 270. The system data model 270 uses the following parameters: timestamp (201), variable name (202), variable units (203), data representation (204), and value (205) to allow the CCM to transmit data to interested nodes.

The local models 280 use the parameters disclosed in FIG. 6B to govern the local management of the CCM. These models include but are not limited to: measurement rate and mode 281, data disposition 282, calibration update 283, sleep 284, conversion 285, local application 286, and operational state 287. The measurement rate and mode model 281 governs the local management of the CCM. By applying the following parameters: physical variable name (252), physical variable units (253), range information (254), calibration information (255), operating environment information (256), and signal representation (257) to the measurement rate and mode model, the CCM customizes the data collecting rate of the transducer module.

Figure 7:
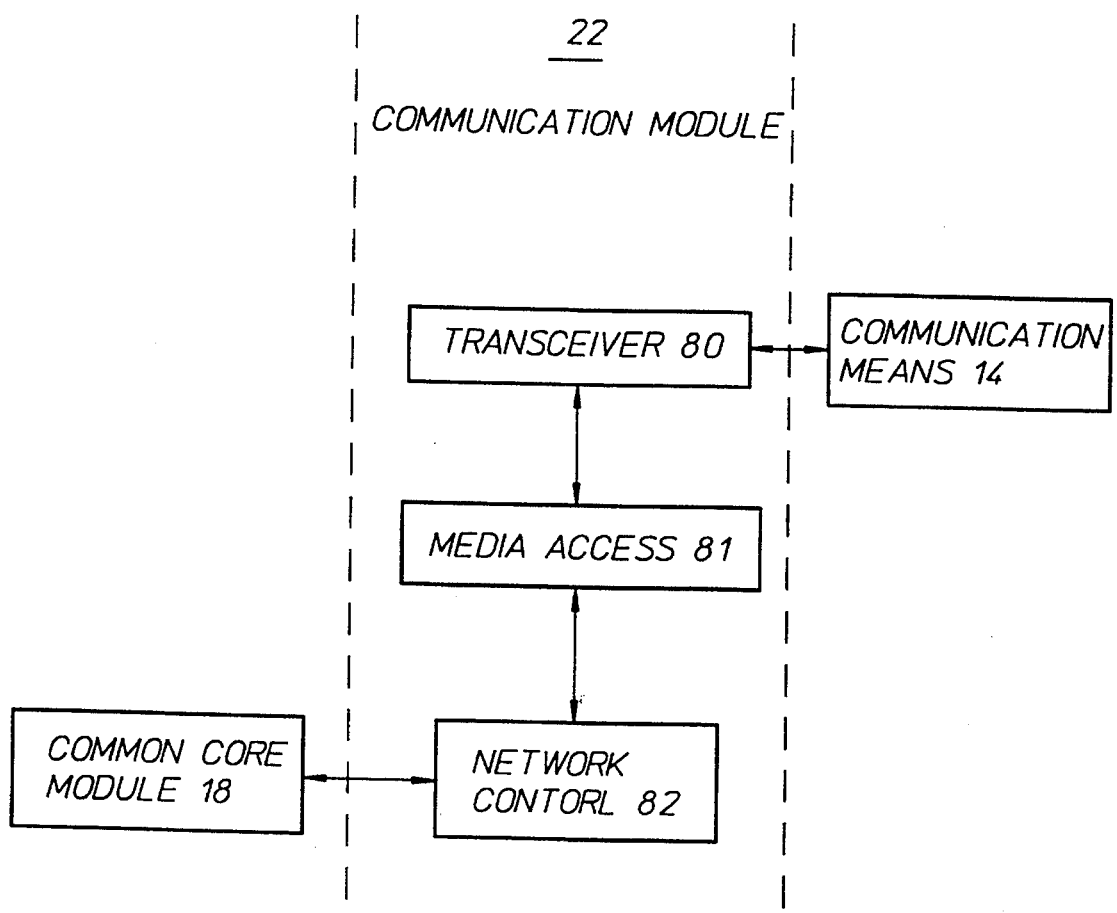
FIG. 7 is a functional block diagram of the communication submodule 22 depicted in FIG. 3.

FIG. 7 is a functional block diagram of the communication submodule 22 depicted in FIG. 3. The module will have a different implementation depending on the communication protocol in use on the communication means 14, e.g. Ethernet (R) protocol on coaxial cable, LONTALK (R) on twisted pair, etc. The details of this block are not part of this invention as the implementation of these protocols is well known in the trade. In general, these implementations involve a transceiver 80 and a media access 81 component which manages the physical access, any necessary encoding or decoding etc. The network control 82 provides features such as address filtering, transport control, and other features of the Open System Interconnect (OSI) protocol stack.

Figure 8:
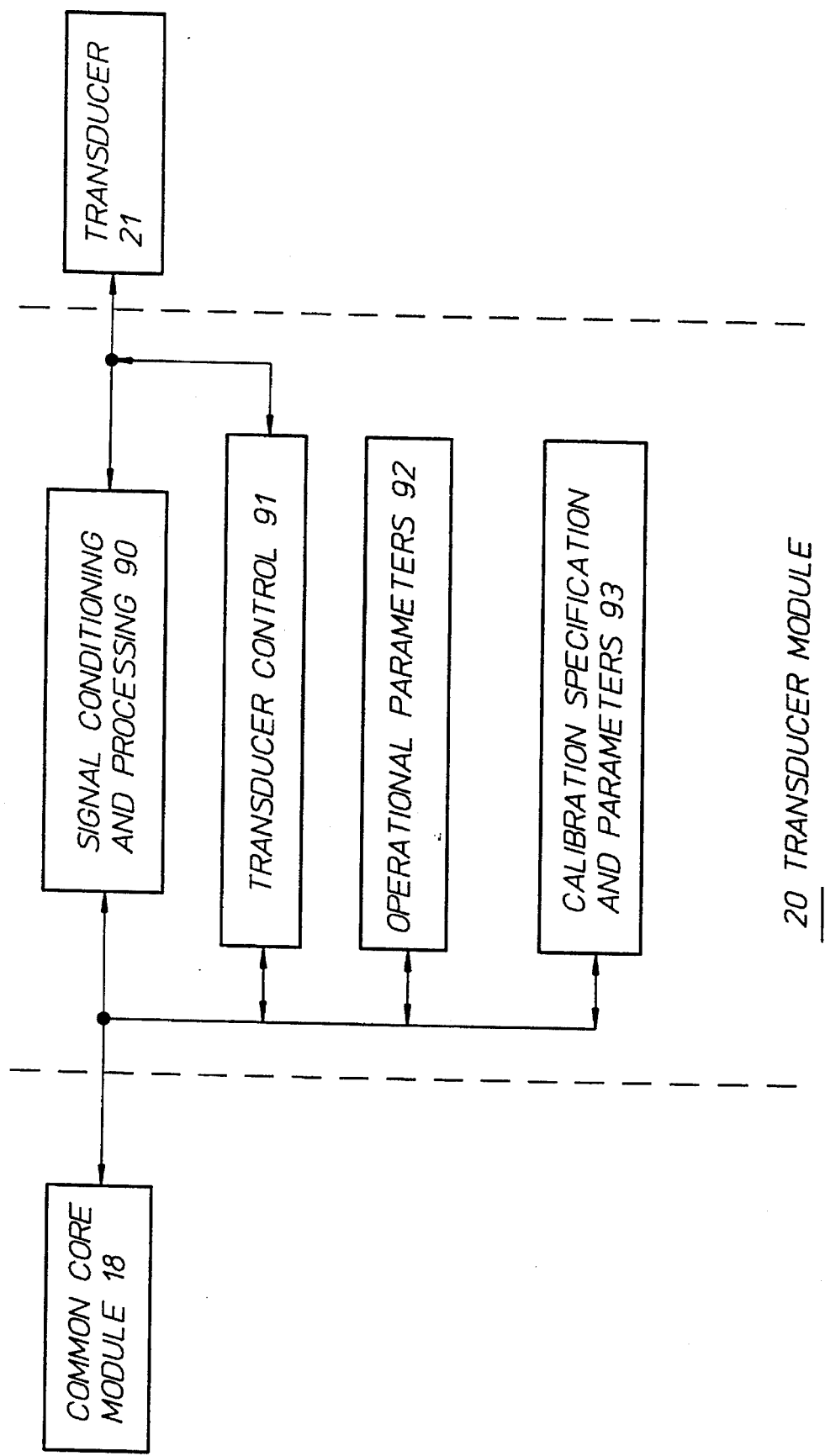
FIG. 8 is a functional block diagram of the transducer module 20 depicted in FIG. 3.

FIG. 8 is a functional block diagram of the transducer module 20. The essential elements of this module are the signal conditioning and processing 90, the transducer control 91, the operational parameters 92, and the calibration specification, and parameters 93. While the general design of this module is as shown, the details will differ to accommodate the specific sensor which is attached to this module. Note also that while this embodiment illustrates the transducer module 20 directly interfacing with the CCM 18 and with the transducer 21 closely attached to the transducer module 20, it is in the scope of this invention to include embodiments where the transducer element 21—transducer module 20, or the transducer module 20—CCM 18 interface may in fact not be in close proximity, e.g. hard-wired or using connectors, but may in fact be at some distance with either one or both of these interfaces being separated by a dedicated communication link as for example a cable, a fiber optic, or a wireless or IR link.

The signal conditioning and processing block 90 includes whatever analog or digital circuitry necessary to accept and process the transducer signal into one of the forms acceptable to the CCM. The transducer control 91 is whatever control is necessary to manage the operation of the transducer based on the signals provided by the CCM e.g. the trigger signal. The operational parameters 92 is the information defined in FIG. 6B except for the calibration information 255 which resides in the calibration specification and parameters block 93. This block is represented as writable and readable data to allow for the transducer to be recalibrated and the appropriate adjustments made in the calibration information.

From the foregoing, it will be appreciated that the present invention provides a distributed monitoring system having at least one flexible distributed node. Every component in the distributed monitoring system uses a uniform format for interaction. The flexible node has a common core module, a communication module, in general, a transducer module with attendant transducer, and optionally an application module. Contained within the common core module are behavioral models and configuration information which along with optional application transformations contained within an application module may be used to allow customizing of individual nodes and the entire system to meet the operational and evolving and peak needs of a particular monitoring and/or control application in an efficient and cost-effective manner. The flexible nodes permit embodiments in which the transducer module and the attendant transducer may be exchanged for added flexibility or replacement in the case of failure and for substitution of a different communication module if it is necessary to change the communication means. The flexible nodes may also be embodied in forms which do not allow for substitution of either the communication module and/or the transducer module and attendant transducer. This may be useful in situation where the added flexibility is not justified by the cost. Since all flexible nodes are based on the uniform format and behavioral models described, they will still work together no matter what the actual embodiment of a specific node provided they use the same communication means and protocol or provision is made for gateways between parts of the system using different communication means and protocols. Such gateways are well known in practice and are not a part of this invention. The distributed monitoring system may also contain flexible system nodes which are of greater complexity than simple sensor or actuator nodes and which may be used for such functions as databases, displays, operator interfaces for generating system control messages, and for more involved computation and control functions that would be convenient to implement in a simpler application module of a flexible node.

We claim:

1. A distributed measurement and control system having a flexible architecture comprising:

a first flexible node for interfacing between a first physical quantity and an electrical signal, wherein the first flexible node includes:

a first transducer module having configuration parameters, and a first common core module, connected to the first transducer module, receiving the configuration parameters;

a second flexible node for interfacing between a second physical quantity and the electrical signal; and transmission means for carrying the electrical signal between the first and second flexible nodes;

the first common core module operative automatically to determine a first self-configuration according to the configuration parameters of the first transducer module, to configure itself according to the first self-configuration, and to interact with the electrical signal according to the first self-configuration.

2. A distributed measurement and control system having a flexible architecture, as defined in claim 1, wherein:

the first flexible node further comprises a sensor that senses the first physical quantity and causes the electrical signal to indicate the value of the physical quantity; and the second flexible node comprises an actuator that controls a physical device in response to the electrical signal.

3. A distributed measurement and control system having a flexible architecture, as defined in claim 2, wherein the first transducer module selects one of a plurality of physical quantities to be sensed.

4. A distributed measurement and control system having a flexible architecture, as defined in claim 2, the second flexible node comprising:

a second transducer module that selects one of a plurality of physical devices to control in response to the electrical signal; and a second common core module connected to the second transducer module, the second common core module operative automatically to determine a second self-configuration according to the second transducer module, to configure itself according to the second self-configuration, and to interact with the electrical signal according to the second self-configuration.

5. A distributed measurement and control system having a flexible architecture, as defined in claim 1, wherein the first flexible node comprises an actuator that controls a physical device in response to the electrical signal and the second flexible node comprises a sensor that senses the second physical quantity and causes the electrical signal to indicate the value of the second physical quantity.

6. A distributed measurement and control system having a flexible architecture, as defined in claim 5, wherein the first transducer module selects one of a plurality of physical devices to control in response to the electrical signal.

7. A distributed measurement and control system having a flexible architecture, as defined in claim 1, the first flexible node further comprising a communication module, connecting between the transmission means and the first common core module, operative to communicate with the second flexible node according to the first self-configuration.

8. A distributed measurement and control system having a flexible architecture, as defined in claim 1, the first common core module further comprising:

control means for governing the interactions between the first transducer module and the first common core module and generating a trigger signal according to the first self-configuration; and updating means for calibrating the first transducer module by producing and modulating a transport signal according to the first self-configuration, the transport signal operative to transport raw measurement information indicative of the first physical quantity.

9. A distributed measurement and control system having a flexible architecture, as defined in claim 1, the first common core module further comprising a cache memory for storing the first self-configuration as determined according to the first transducer module.

10. A distributed measurement and control system having a flexible architecture, as defined in claim 1, the system further comprising:

a system module, connected to the transmission means and operative to send a control signal to the first transducer and thereby modify the first self-configuration;

the first common core module operative to configure itself according to the modified first self-configuration and to interact with the electrical signal according to the modified first self-configuration.

\* \* \* \* \*